United States Patent

Orosz

[15] 3,704,632

[45] Dec. 5, 1972

[54] REVOLVING STROKE DRIVE

[72] Inventor: Joseph Orosz, 324 Machen, Toledo, Ohio 43620

[22] Filed: July 2, 1970

[21] Appl. No.: 51,963

[52] U.S. Cl. .................................................. 74/127
[51] Int. Cl. ........................................... F16h 25/12
[58] Field of Search ............... 74/88, 127; 92/32, 33

[56] References Cited

UNITED STATES PATENTS

| | | | |
|---|---|---|---|
| 848,703 | 4/1907 | Taylor | 74/127 |
| 1,076,179 | 10/1913 | Whitehead | 74/127 |

*Primary Examiner*—Milton Kaufman
*Attorney*—Owen & Owen

[57] ABSTRACT

A drive unit for translating reciprocating motion into unidirectional rotary motion is disclosed. The drive unit incorporates an elongate reciprocating cylinder which comprises a center section having a spiral gear on its outer surface. The spiral gear engages an internal spiral sliding clutch element and fixed internal spiral hubs. The internal spiral sliding clutch element alternately engages either of a pair of pinion gears which in turn engage opposing drive gears. An output shaft connected to the drive gears rotates in a single direction in response to each reciprocation of the cylinder.

3 Claims, 3 Drawing Figures

PATENTED DEC 5 1972 3,704,632
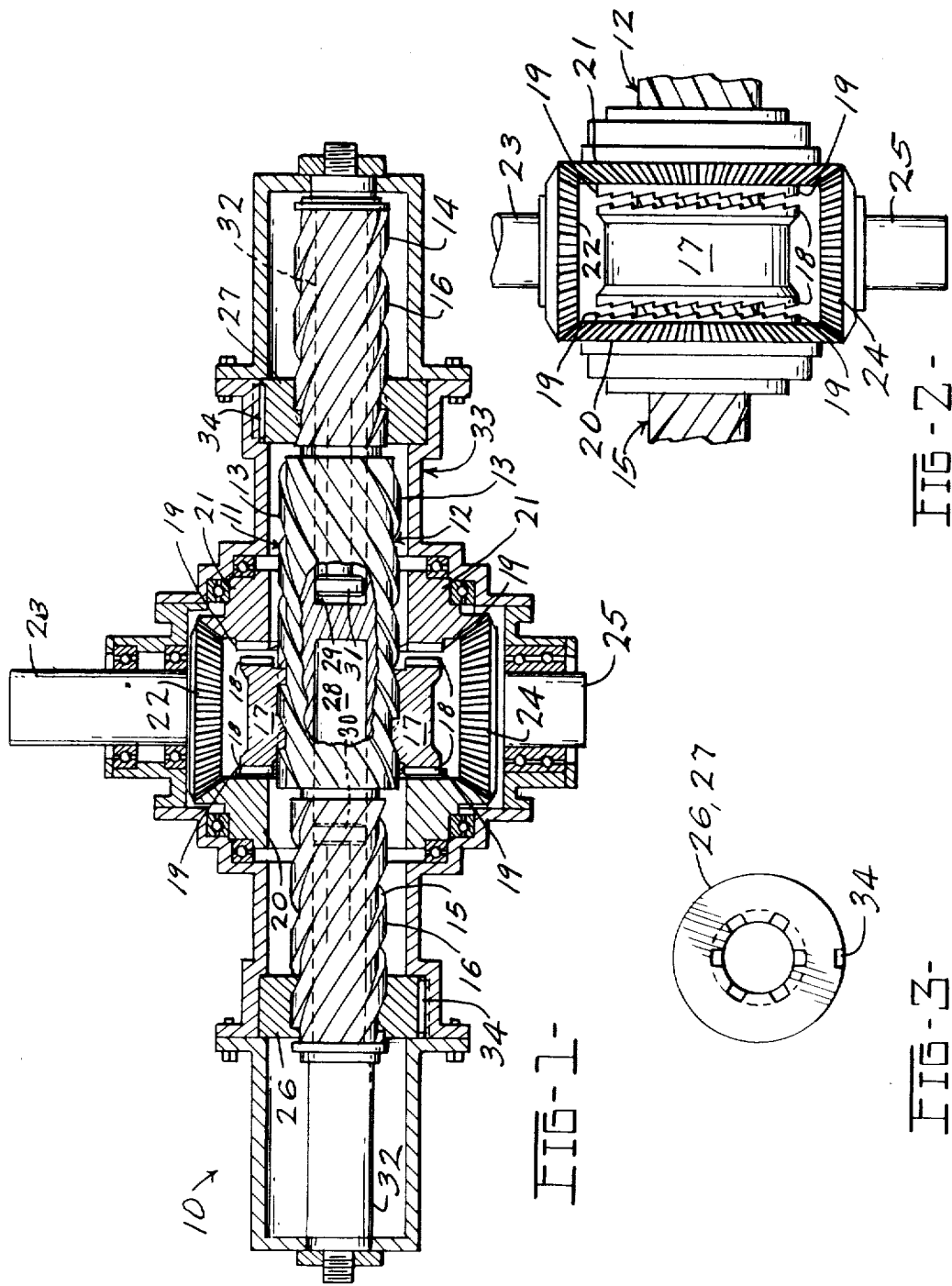

REVOLVING STROKE DRIVE

DESCRIPTION OF THE PREFERRED EMBODIMENT

This invention relates generally to drive mechanisms.

A principal object of the present invention is to provide a revolving stroke drive which translates one stroke of a reciprocating cylinder into one or more than one full revolutions of a power output shaft.

Another object of the present invention is to provide a revolving stroke drive which can be used any place where an open flame, sparks, or explosives are not permitted.

Other objects of the present invention are to provide a revolving stroke drive which is simple in design, inexpensive to manufacture, rugged in construction, and simple in operation.

These and other objects will be readily evident upon a study of the following specification and the accompanying drawing wherein:

FIG. 1 is a longitudinal cross-sectional view of the present invention;

FIG. 2 is a detail view of parts in neutral position; and

FIG. 3 is an end elevation view of a right-hand internal spiral hub.

Referring to FIG. 1, there is shown a revolving stroke drive 10 comprising a double-action cylinder 11 which includes a central section 12 having a left-hand spiral 13 upon its outer side.

The double-action cylinder 11 further includes opposite end sections 14 and 15 each of which is provided with a right-hand spiral 16 upon its outer side.

Upon the left-hand spiral 13 there is engaged a left-hand internal spiral sliding clutch element 17, the clutch element 17 being slideable along the longitudinal axis of the center section 12.

Radially extending teeth 18 are provided on opposite side faces of the clutch element 17. The teeth 18 are selectively engageable with radially extending teeth 19 on one side of a pinion gear 20, while the opposite teeth 18 of the clutch element 17 are selectively engageable with radially extending teeth 19 of a pinion gear 21.

The pinion gears 20 and 21 engage opposite sides of a drive gear 22 fixed on an output power shaft 23. The pinion gears 20 and 21 also at the same time engage opposite sides of a gear 24 secured upon a shaft 25.

The right-hand spiral 16 is in engagement with a right-hand internal spiral hub 26. The opposite right-hand spiral 16 is in engagement with a right-hand internal spiral hub 27.

The double-action cylinder 11 defines axial bores 28 and 29 into which opposing pistons 30 and 31 extend from shafts 32 fixed to a housing 33.

As shown in FIG. 3, each of the right-hand internal spiral hubs 26 and 27 are provided with a keyway 34 for engaging a key retained to the housing 33.

In operation when the double-action cylinder 11 reciprocates between the pistons 30 and 31 the spiral gears 16 provide a rotating motion to the cylinder 11.

When the cylinder 11 is translated to the left, the freewheeling clutch element 17 engages with and turns the pinion gear 20 and disengages with the pinion gear 21. When the cylinder 11 is translated to the right, it engages with and turns the pinion gear 21 and disengages with the pinion gear 20. The drive gear 22 and shaft 23 always turn left. The gear 24 always turns right. Therefore, the output power shaft 23 always remains turning in the same direction.

What I now claim is:

1. A drive unit comprising a housing, opposing pistons fixed to said housing, an elongate cylinder having axial bores therein receiving said pistons, a spiral gear about the periphery of said cylinder, means connected to said housing and engaging said spiral gear for imparting rotation in a first direction and a second direction to said cylinder upon reciprocation of said cylinder between said pistons, pinion gears having opposing faces rotatably mounted within said housing, drive gears meshed with said pinion gears and affixed to an output shaft, an annular clutch element meshed upon said spiral gear for translation between said opposing faces of said pinion gears whereby rotation of said cylinder in said first direction translates said clutch element into driving engagement with one of said opposing faces, to drive said pinion gear and said drive gear and said output shaft in one direction, and whereby rotation of said cylinder in said second direction translates said clutch element into driving engagement with the opposite of said faces to drive said drive gear and said output shaft in said same one direction.

2. A drive unit comprising a housing, an elongate cylinder having opposing axial bores therein, opposing pistons fixed to said housing and extending within said axial bores to cause reciprocation of said cylinder between said pistons, first spiral gears about the periphery of a segment of said cylinder, hub members fixed to said housing and meshed with said first spiral gears for imparting rotation in a first direction and a second direction to said cylinder upon reciprocation of said cylinder between said pistons, a second spiral gear about a segment of said cylinder, pinion gears having opposing faces rotatably mounted within said housing, drive gears meshed with said pinion gears and affixed to an output shaft, an annular clutch element meshed upon said second spiral gear for translation between said opposing faces of said pinion gears whereby rotation of said cylinder in said first direction translates said clutch element into rotating contact with one of said opposing faces to drive said pinion gear, and said drive gear and said output shaft in one direction, and whereby rotation of said cylinder in said second direction translates said clutch element into rotating contact with an opposite of said faces to drive said drive gear and said output shaft in said same one direction.

3. A drive unit comprising a housing, a driven reciprocatable member within said housing, gear means operably connected to a prime mover and meshed with said housing for imparting a rotating motion to said reciprocatable member in a first direction and a second direction as said driven member reciprocates within said housing, pinion gears having opposing faces, drive gears meshed with said pinion gears and connected to an output shaft, and clutch means driven by said gear means for translatory movement between said opposing faces of said pinion gears whereby rotation of said driven reciprocatable member in said first and said second directions translates said clutch means into rotating contact with one then the other of said opposing faces of said pinion gears to drive said drive gear and said output shaft in a single direction.

* * * * *